United States Patent Office 3,706,567
Patented Dec. 19, 1972

3,706,567
SUPERSENSITIZED PHOTOGRAPHIC EMULSIONS
Gary L. Hiller, Hilton, N.Y., assignor to Eastman Kodak Company, Rochester, N.Y.
No Drawing. Filed Nov. 17, 1970, Ser. No. 90,435
Int. Cl. G03c 1/14
U.S. Cl. 96—126
6 Claims

ABSTRACT OF THE DISCLOSURE

Light-sensitive photographic silver halide emulsions containing symmetrical or unsymmetrical cyanine or merocyanine imidazolo[4,5-b]quinoline dyes, and as super-sensitizers therefor, colorless derivatives of bis(s-triazin-2-ylamino)stilbene disulfonic acids.

This invention relates to novel photographic emulsions, and more particularly to spectrally sensitized photographic silver halide emulsions.

It is known in the art of making photographic emulsions that certain dyes of the cyanine and merocyanine classes alter the sensitivity of silver halide emulsions. It is also known that various combinations of two or more sensitizing dyes have also been proposed to alter the sensitivity of such emulsions. For example, benzimidazolocarbocyanine dyes enter into supersensitizing combinations with various other dyes as described in French Pat. 1,209,924, and U.S. Pats. 2,751,298; 3,173,791 and 3,364,031.

Derivatives of triazinylamino-stilbene sulfonic acids have also been used as supersensitizers for certain classes of dyes, among which are the merocyanine dyes described in U.S. Pat. 3,416,927. However, these prior art references do not suggest the use of imidazolo[4,5-b]quinoline derivatives in supersensitizing dye combinations.

A need has existed for new supersensitizing dye combinations which provide higher speed for silver halide emulsions, e.g., with respect to yellow light sensitivity but which also enable the emulsions in which they are incorporated to maintain satisfactory fog levels and contrast. Furthermore, a need has existed for improvement of the spectral sensitization of the imidazolo[4,5-b]quinoline dyes in such a way that they can be employed in silver halide emulsions to greater advantage.

We have now discovered novel supersensitizing combinations which meet these needs.

Our novel compositions in general comprise the photographic emulsions containing cyanine or merocyanine dyes having imidazolo[4,5-b]quinoline nuclei and, as supersensitizers therefor, colorless derivatives of bis(s-triazin-2-ylamino)stilbene disulfonic acids. Our invention is thus based on the discovery that the incorporation of the triazinylamino-stilbene sulfonic acid compounds with the imidazolo[4,5-b]quinoline dyes provides supersensitization which exceeds and in most instances far exceeds that of dye combinations of the prior art. Furthermore, the emulsions in which this supersensitizing combination is incorporated, as distinguished from some supersensitizing combinations which provide extreme improvement in speed, retain satisfactory fog levels, keeping qualities and contrast.

The cyanine and merocyanine imidazolo[4,5-b]quinoline dyes employed in the novel sensitizing combinations can be represented by the following general formulae:

(1)

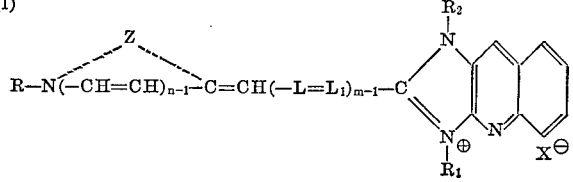

and (2)

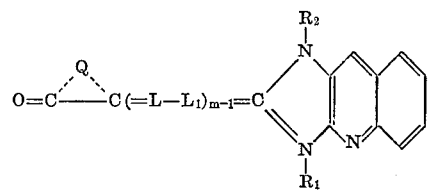

In the above formulae, Z represents the nonmetallic atoms required to complete a heterocyclic nucleus having from 5- to 6-atoms in the heterocyclic ring, which can contain a second hetero atom, e.g., a hetero oxygen, sulfur or selenium atom, or a second nitrogen atom, such as, a thiazole nucleus (e.g., thiazole, 4-methylthiazole, 4-phenylthiazole, 5-methylthiazole, 4,5-dimethylthiazole, 4,5-diphenylthiazole, etc.); a benzothiazole nucleus (e.g., benzothiazole, 4-chlorobenzothiazole, 5-chlorobenzothiazole, 4-methylbenzothiazole, 6-methylbenzothiazole, 5-bromobenzothiazole, 5 - methoxybenzothiazole, 6 - iodobenzothiazole, 5,6-dimethoxybenzothiazole, etc.); a naphthothiazole nucleus (e.g., α-naphthothiazole, β-naphthothiazole, 5-methoxy-β-naphthothiazole, 8-ethoxy-α-naphthothiazole, β,β-naphthothiazole, etc.); a thianaphtheno-7′,6′,4,5-thiazole nucleus (e.g., 4′-methoxythianaphtheno-7′,6′,4,5-thiazole, etc.); an oxazole nucleus (e.g., 4-methyloxazole, 5-methyloxazole, 4-phenyloxazole, 4,5-diphenyloxazole, 4-ethyloxazole, 4,5-diethyloxazole, etc.); a benzoxazole nucleus (e.g., benzoxazole, 5-chlorobenzoxazole, 5 - methylbenzoxazole, 5 - phenylbenzoxazole, 6 - methylbenzoxazole, 5,6 - dimethylbenzoxazole, 4,6 - dimethylbenzoxazole, 5-ethoxybenzoxazole, 5,6-dichlorobenzoxazole, 5-hydroxybenzoxazole, etc.); a naphthoxazole nucleus (e.g., α-naphthoxazole, β-naphthoxazole, β,β-naphthoxazole, etc.); a selenazole nucleus (e.g., 4-methylselenazole, 4-phenylselenazole, etc.); a benzoselenazole nucleus (e.g., benzoselenazole, 5-chlorobenzoselenazole, 6-methoxybenzoselenazole, 5 - hydroxybenzoselenazole, a tetrahydrobenzoselenazole, etc.); a naphthoselenazole nucleus (e.g., α-naphthoselenazole, β-naphthoselenazole, β,β-naphthoselenazole, etc.); a thiazoline nucleus (e.g., thiazoline, 4-methylthiazoline, etc.); a 2-pyridine nucleus (e.g., 2-pyridine, 5-methyl-2-pyridine, etc.); a 4-pyridine nucleus (e.g., 4-pyridine, 3-methyl-4-pyridine, etc.); a 2-quinoline nucleus (e.g., 2-quinoline, 3-methyl-2-quinoline, 5-ethyl-2-quinoline, 6-chloro-2-quinoline, 8-chloro-2-quinoline, 4 - methoxy - 2 - quinoline, 8 - hydroxy - 2 - quinoline, etc.); a 4-quinoline nucleus (e.g., 4-quinoline, 5-methyl-4-quinoline, 7-methyl-4-quinoline, 8-chloro-4-quinoline, etc.); a 1-isoquinoline nucleus (e.g., 1-isoquinoline, 3,4-dihydro-1-isoquinoline, etc.); a 3-isoquinoline nucleus (e.g., 3-isoquinoline, etc.); a 3,3dialkylindolenine nucleus (e.g., 3,3-dimethylindolenine, 3,3,5-trimethylindolenine, 3,3,7-trimethylindolenine, etc.); an imidazole nucleus (e.g., imidazole, 1-alkylimidazole, 1-alkyl-4-phenylimidazole, 1-alkyl-4,5-dimethylimidazole, etc.); a benzimidazole nucleus (e.g., benzimidazole, 1-alkylbenzimidazole, 1-arylbenzimidazole, 5,6-dichlorobenzimidazole, etc.); or a naphthimidazole nucleus (e.g., 1-alkyl-α-naphthimidazole, 1-aryl-β-naphthimidazole, 1-alkyl-5-methoxy-β-naphthimidazole, etc.);

R represents an alkyl group having from 1 to 18 carbon atoms (e.g., methyl, sulfoethyl, hydroxyethyl, hydroxypropyl, sulfobutyl, carboxybutyl, hexyl, octyl, dodecyl, etc.) or an aryl group of 6 to 12 carbon atoms (e.g., phenyl, sulfophenyl, carboxyl, tolyl, etc.);

$R_1$ represents an alkyl group (e.g., methyl, ethyl, propyl, butyl, hexyl, cyclohexyl, octadecyl, carboxymethyl, 3-carboxypropyl, 4-carboxybutyl, sulfomethyl, 2-sulfomethyl, 4-sulfobutyl, etc.);

$R_2$ represents an alkyl group (e.g., methyl, ethyl, propyl, butyl, hexyl, cyclohexyl, dodecyl, octadecyl, benzyl, phenethyl, etc.); or an aryl group (e.g., phenyl, p-tolyl, m-tolyl, 3,4-dichlorophenyl, etc.);

L and $L_1$, which can be the same or different, represent methine groups such as —CE—, where E represents hydrogen, a lower alkyl, such as methyl, butyl, etc., an aryl group such as tolyl, naphthyl, etc., or a heterocyclic group, such as 2-thienyl, 2-pyrryl, 3-pyrryl, 2-indolyl, 3-indolyl, 3-pyridyl, 4-pyridyl, or

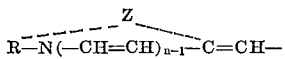

etc., such that not more than one of L and $L_1$ contains an E group that is other than hydrogen;

$n$ represents an integer from 1 to 2 and $m$ represents an integer from 1 to 3;

X represents an acid anion, e.g., chloride, bromide, iodide, thiocyanate sulfonate, perchlorate, p-toluene sulfate, methyl sulfate, etc.; and Q represents the non-metallic atoms necessary to complete a heterocyclic nucleus containing from 5 to 6 atoms in the heterocyclic ring, 3 to 4 of said atoms being carbon and 2 of said atoms being selected from nitrogen, oxygen or sulfur with at least one of said two atoms being nitrogen.

In the merocyanine dyes described herein, advantageous heterocyclic nuclei completed by the non-metallic atoms represented herein by Q include those of the thiazolone series, for example 2-thiazolin-4-one; those of the 2,4-thiazolidinedione series such as 2,4-thiazolidinedione, 3-alkyl-2,4-thiazolidinediones (e.g. 3-ethyl-2,4-thiazolidinedione, etc.) 3-phenyl-2,4-thiazolidinedione, 3α-naphthyl-2,4-thiazolidinedione, etc., those of the 2-thio-2,4-thiazolidinedione (rhodanine) series, such as 3-alkyl-2-thio-2,4-thiazolidinedione (3-alkylrhodanines), (e.g., 3-ethyl-2-thio-2,4-thiazolidinedione (or 3-ethylrhodanine)), 3-phenyl-2-thio-2,4-thiazolidinedione (3-phenylrhodanine), 3-α-naphthyl-2-thio-2,4-thiazolidinedione (3-α-naphthylrhodanine), 3-(1-benzothiazyl) - 2 - thio-2,4-thiazolidinedione-(3-(1-benzothiazyl)-rhodanine, etc., those of the 2-thio-2,5-thiazolidinedione series, such as 3-alkyl (e.g. 3-methyl, 3-ethyl, etc.)-2-thio-2,5-thiazolidinediones, etc.), those of the 2-alkylmercapto-2-thiazolin-4-one series, such as 2-ethylmercapto-2-thiazolin-4-one, etc., those of the thiazolidinone series, such as 4-thiazolidinone or its 3-alkyl (e.g., ethyl, etc.), 3-phenyl or 3α-naphthyl derivatives, those of the 2-alkylphenylamino-2-thiazolin-4-one series (e.g. 2-ethylphenylamino -2 - thiazolin-4-one, etc.), those of the 2-diphenylamino - 2 - thiazolin-4-one series; those of the 2-thiazolin-5-one series, such as 2-ethylthio-2-thiazolin-5-one, 2-benzylthio-2-thiazolin-5-one, etc., those of the oxazolone series, for example; those of the 2-thio-2,4-oxazolidinedione series, such as 3-alkyl-2-thio-2,4-oxazolidinediones (e.g., 3-ethyl - 2 - thio-2,4-oxazolidinedione, etc.), those of the 2-imino - 4 - oxazolidinone (pseudohydantoin) series, etc.; those of the 2-oxazolin-5-one series, such as 2-phenyl-2-oxazolin-5-one, 2-ethyl-2-oxazolin-5-one, etc., those of the 2-isoxazolin-5-one series, such as 3-phenyl-2-isoxazolin-5-one, etc., those of the imidazolone series, for example; those of the hydantoin series, such as hydantoin, or its 3-alkyl-(e.g., ethyl, propyl, etc.), 3-phenyl or 3-α-naphthyl derivatives as well as its 1,3-dialkyl (e.g., 1,3-diethyl, etc.), 1-alkyl-3-phenyl (e.g. 1-ethyl-3-phenyl, etc.), 1-alkyl-3-naphthyl (e.g. 1-ethyl-3-α-naphthyl, etc.), 1,3-diphenyl, etc. derivatives, those of the 2-thiohydantoin series, such as 2-thiohydantoin, or its 3-alkyl (e.g. 3-ethyl, etc.), 3-phenyl or 3-α-naphthyl derivatives as well as its 1,3-dialkyl (e.g. 1,3-diethyl, etc.), 1-alkyl-3-phenyl (e.g. 1-ethyl-3-phenyl, etc.), 1-alkyl-3-naphthyl (e.g. 1-ethyl-3-α-naphthyl), 1,3-diphenyl, etc. derivatives, those of the 2-alkylmercapto-2-imidazolin-5-one series, such as 2-n-propylmercapto - 2 - imidazolin-5-one; those of the thionaphthenone series, such as 2(3H)-benzothiophenone or 3(2H)-benzothiophenone; those of the pyrazolone series, such as 2-pyrazolin-5-one or its 1-alkyl (e.g., methyl, ethyl, etc.), 1-phenyl, 1-naphthyl (e.g. 1-α-naphthyl), 3-alkyl (e.g. methyl, ethyl, etc.), 3-phenyl, 3-naphthyl(3-α-naphthyl), 1-alkyl-3-phenyl (e.g. 1-methyl-3-phenyl, etc.), 3-alkyl-1-phenyl (e.g. 3-methyl-1-phenyl, etc.), 1,3-dialkyl (e.g. 1,3-dimethyl, etc.), 1,3-diphenyl, etc. derivatives; those of the oxindole series, such as 3(2H)-indolinone and like five-membered heterocyclic nuclei; those of the 2,4,6 - triketohexahydropyrimidine series, for example, barbituric acid (2,4,6-triketohexahydropyrimidine), 2-thiobarbituric acid (2-thio-2,4,6-triketohexahydropyrimidine), as well as their 1-alkyl (e.g. 1-ethyl, etc.), or 1,3-dialkyl-(1,3-diethyl, etc.) derivatives.

Cyanine and merocyanine dyes having imidazolo[4,5-b]quinoline nuclei and embraced by Formulas 1 and 2 above have been described in the prior art. For instance, dyes of this type and methods of preparing them are described in Jenkins et al., U.S. 3,326,688. Included among the dyes of Formulas 1 and 2 are the following typical examples:

| Dye number: | Dye name |
|---|---|
| I | 1,1',3,3'-tetraethyl-1H-imidazolo[4,5-b]quinocarbocyanine iodide. |
| II | 3,3'-diethyl-1,1'-diphenyl-1H-imidazolo-[4,5-b]quinocarbocyanine iodide. |
| III | 3,3'-dimethyl-1,1'-diphenyl-1H-imidazolo-[4,5-b]quincoarbocyanine iodide. |
| IV | 3,3'-diethyl-1-phenyl-1H-imidazoloquinothiacarbocyanine iodide. |
| V | 1,3-diethyl-1',3',3'-trimethyl-1H-imidazolo-[4,5-b]quinoindocarbocyanine iodide. |
| VI | 1,3,3'-triethyl-1H-imidazolo[4,5-b]-quino-oxacarbocyanine iodide. |
| VII | 1',1,3-triethyl-1H-imidazolo[4,5-b]-quino-2'-carbocyanine iodide. |
| VIII | 3-ethyl-5-[(1,3-diethyl-1H-imidazolo-[4,5-b]quinolin-2-ylidene)-ethylidene]-2-thio-2,4-oxazolidinedione. |
| IX | 3-ethyl-5-[(1,3-diethyl-1H-imidazolo[4,5-b]quinolin-2-ylidene)ethylidene]rhodanine. |
| X | 3-ethyl-5-[(3-ethyl-1-phenyl-1H-imidazolo[4,5-b]quinolylidene)-ethylidene]rhodanine. |
| XI | 3-ethyl-5-[(3-ethyl-1-phenyl-1H-imidazolo-[4,5-b]quinolin-2-ylidene)ethylidene]-2-thio-2,4-oxazolidinedione. |
| XII | 1-ethyl-5-[(3-ethyl-1-phenyl-1H-imidazolo[4,5-b]quinolin-2-ylidene)-ethylidene]-2-thiobarbituric acid. |
| XIII | 3-ethyl-5-[(3-ethyl-1-phenyl-1H-imidazolo[4,5-b]quinolin-2-ylidene)-ethylidene]-1-phenyl-2-thiohydantoin. |

The triazinylamino-stilbene sulfonic acid compounds can be represented by the following general formula:

(3)

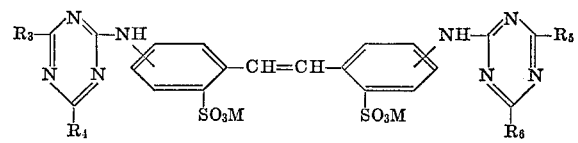

wherein M represents a hydrogen atom or water-soluble cation salt group, e.g., sodium, potassium, ammonium, triethylammonium, triethanolammonium, pyridinium, etc., and $R_3$, $R_4$, $R_5$, and $R_6$ each represents a hydrogen atom or a substituent group, such as hydroxyl, aryloxyl (e.g., phenoxyl, o-toloxyl, p-sulfophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolylthio, etc.), a heterocyclylthio group (e.g., benzothiazylthio, etc.), an amino group, an alkylamino group (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), an arylamino group (e.g., anilino, o-, m-, and p-sulfoanilino, o-, m-, and p-chloroanilino, o-, m-, and p-anisylamino, o-, m-, and p-toluidino, o-, m-, and p-carboxyanilino, hydroxyanilino, sulfonaphthylamino, o-, m-, and p-aminoanilino, o-acetamidoanilino, etc.), etc. In such substituents the phenyl groups can also be further substituted, e.g., with halogen.

Sulfonated triazinylamino-stilbene compounds of Formula 3 have been disclosed, for example, in U.S. Pats. 3,416,927 and 2,933,390. Included among such sulfonated stilbene compounds are the following typical examples:

| Name | |
|---|---|
| Compound: | |
| W | 4,4'-bis[2-phenoxy-4-(2-hydroxyethylamino)-s-triazin-6-ylamino]stilbene-2,2'-disulfonic acid, disodium salt. |
| X | 4,4'-bis[anilino-6-hydroxy-s-triazin-2-ylamino]stilbene-2,2'-disulfonic acid, disodium salt. |
| Y | Calcofluor White-MR. This is the trade name for a bis(s-triazin-2-ylamino)stilbene-2,2'-disulfonic acid, sodium salt. |
| Z | Leucophor B. This is the trade name for a bis(s-triazin-2-ylamino)stilbene-2,2'-disulfonic acid, sodium salt. |

In accordance with the present invention, one or more of the cyanine or merocyanine dyes represented by Formulas 1 and 2 is incorporated with one or more of the sulfonated derivatives represented by Formula 3 in a silver halide emulsion such as a gelatino-silver chloride, -chlorobromide or -iodobromide or bromide developing out negative emulsion.

The cyanine and merocyanine dye should be added to the emulsion before or simultaneously with the sulfonated supersensitizing compound.

The optimum concentrations of the sensitizing dye and the supersensitizing compound can be determined in a manner well-known to others skilled in the art by measuring the sensitivity of a series of test portions of the same emulsion, each containing a different concentration of the compounds. As a general guideline, good results are obtained with about .01 to 1 gram dye per mole of silver and about 25 to 2000 mg. and preferably 50 to 1000 mg. per mole of silver of the sulfonated organic supersensitizer.

Silver halide emulsions supersensitized in accordance with this invention can comprise silver chloride, silver bromide, silver bromoiodide, silver chlorobromoiodide or mixtures thereof. Such emulsions can be coarse, medium or fine grain (or mixtures thereof) and can be prepared by any of the well-known procedures, e.g., single jet or double jet procedures. Useful emulsions include Lippmann emulsions, ammoniacal emulsions, thiocyanate or thio-ether ripened emulsions such as those described in Nietz et al. U.S. Pat. 2,222,264; Illingsworth U.S. Pat. 3,320,069 and McBride U.S. Pat. 3,271,157; or, cubic grain emulsions, such as those described by Kline and Moisar, Journal of Photographic Science, vol. 12, pp. 242 et seq., or Markocki "The Spectral Sensitization of Silver Bromide Emulsions on Different Crystallographic Faces," Journal of Photographic Science, vol. 13, 1965; or Illingsworth British Pat. 1,156,193 published June 25, 1969.

The silver halide emulsions supersensitized with the dyes of this invention can be unwashed or washed to remove soluble salts. In the latter case the soluble salts can be removed by chill-setting and leaching or the emulsion can be coagulation washed, e.g., by the procedures described in Hewitson et al. U.S. Pat. 2,618,556; Yutzy et al. U.S. Pat. 2,614,928; Yackel U.S. Pat. 2,565,418; Hart et al. U.S. Pat. 3,241,969; and Waller et al. U.S. Pat. 2,489,341.

Photographic emulsions containing supersensitizing combinations in accordance with this invention can be sensitized with chemical sensitizers, such as with reducing agents; sulfur, selenium or tellurium compounds; gold, platinum or palladium compounds; or combinations of these. Suitable chemical sensitization procedures are described in Shepard U.S. Pats. 1,623,499; Waller U.S. Pat. 2,399,083; McVeigh U.S. Pat. 3,297,447; and Dunn U.S. Pat. 3,297,446.

The supersensitized silver halide emulsions of this invention can contain speed increasing compounds such as polyalkylene glycols, cationic surface active agents and thioethers or combinations of these as described in Piper U.S. Pat. 2,886,437; Chechak U.S. Pat. 3,046,134; Carroll et al. U.S. Pat. 2,944,900; and Goffe U.S. Pat. 3,294,540.

Silver halide emulsion containing the supersensitizing combinations of this invention can be protected against the production of fog and can be stabilized against loss of sensitivity during keeping. Suitable antifoggants and stabilizers, which can be used alone or in combination, include the thiazolium salts described in Staud U.S. Pat. 2,131,038 and Allen U.S. Pat. 2,694,716; the azaindenes described in Piper U.S. Pat. 2,886,437 and Heimbach U.S. Pat. 2,444,605; the mercury salts described in Allen U.S. Pat. 2,728,663; the urazoles described in Anderson U.S. Pat. 3,287,135; the sulfocatechols described in Kennard U.S. Pat. 3,236,652; the oximes described in Carroll et al. British Pat. 623,448; nitron, nitroindazoles; the mercaptotetrazoles described in Kendall et a. U.S. Pat. 2,403,927, Kennard et al. U.S. Pat. 3,266,897 and Luckey et al. U.S. Pat. 3,397,987; the polyvalent metal salts described in Jones U.S. Pat. 2,839,405; the thiuronium salts described in Herz U.S. Pat. 3,220,839; and the palladium, platinum and gold salts described in Trivelli U.S. Pat. 2,566,263 and Damschroder U.S. Pat. 2,597,915.

Photographic elements including emulsions supersensitized in accordance with this invention can contain incorporated developing agents such as hydroquinones, catechols, aminophenols, 3-pyrazolidones, ascorbic acid and its derivatives, reductones and phenylenediamines, or combinations of developing agents. The developing agents can eb in a silver halide emulsion and/or in another suitable location in the photographic element. The developing agents can be added from suitable solvents or in the form of dispersions as described in Yackel U.S. Pat. 2,592,368 and Dunn et al. French Pat. 1,505,778.

Silver halide supersensitized in accordance with the invention can be dispersed in colloids that can be hardened by various organic or inorganic hardeners, alone or in combination, such as the aldehydes, and blocked aldehydes, ketones, carboxylic and carbonic acid derivatives, sulfonate esters, sulfonyl halides and vinyl sulfones, active halogen compounds, epoxy compounds, aziridines, active olefins, isocyanates, carbodiimides, mixed function hardeners and polymeric hardeners such as oxidized polysaccharides, e.g., dialdehyde starch oxyguargum, etc.

Photographic emulsions supersensitized with the dye combinations hereof can contain various colloids alone or in combination as vehicles or binding agents. Suitable hydrophilic materials include both naturally occurring substances such as proteins, for example, gelatin, gelatin derivatives, cellulose derivatives, polysaccharides, such as dextran, gum arabic and the like, and synthetic polymeric substances such as water soluble polyvinyl compounds, e.g., poly(vinylpyrrolidone)acrylamide polymers or other synthetic polymeric compounds such as dispersed vinyl compounds in latex form, and particularly those which increase the dimensional stability of the photographic materials. Suitable synthetic polymers include those described, for example, in U.S. Pats. 3,142,568 of Nottorf, issued July 28, 1964; 3,193,386 of White, issued July 6, 1965; 3,062,674 of Houck, Smith and Yudelson, issued Nov. 6, 1962; 3,220,844 of Houck, Smith and Yudelson, issued Nov. 30, 1965; Ream and Fowler 3,287,289, issued Nov. 22, 1966, and Dykstra U.S. Pat. 3,411,911; particularly effective are those water-insoluble polymers of alkyl acrylates and methacrylates, acrylic acid, sulfoalkyl acrylates or methacrylates, those which have crosslinking sites which facilitate hardening or curing and those having recurring sulfobetaine units as described in Canadian Pat. 774,054.

Emulsions supersensitized in accordance with this invention can be used in photographic elements which contain antistatic or conducting layers, such as layers that comprise soluble salts, e.g., chlorides, nitrates, etc., evaporated metal layers, ionic polymers such as those described in Minsk U.S. Pats. 2,861,056 and 3,206,312 or insoluble inorganic salts such as those described in Trevoy U.S. Pat. 3,428,451.

Photographic emulsions containing the supersensitizing combinations of the invention can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers, and the like.

Supersensitized emulsions of the invention can contain plasticizers and lubricants such as polyalcohols, e.g., glycerin and diols of the type described in Milton U.S. Pat. 2,960,404, fatty acids or esters such as those described in Robijns U.S. Pat. 2,588,765 and Duane U.S. Pat. 3,121,060; and silicone resins such as those described in Du Pont British Pat. 955,061.

The photographic emulsions supersensitized as described herein can contain surfactants such as saponin, anionic compounds such as the alkyl aryl sulfonates described in Baldsiefen U.S. Pat. 2,600,831 and amphoteric compounds such as those described in Ben-Ezra U.S. Pat. 3,133,816.

Photographic elements containing emulsion layers sensitized as described herein can contain matting agents such as starch, titanium dioxide, zinc oxide, silica, polymeric beads including beads of the type described in Jelley et al. U.S. Pat. 2,992,101 and Lynn U.S. Pat. 2,701,245.

Spectrally sensitized emulsions of the invention can be utilized in photographic elements which contain brightening agents including stilbene, triazine, oxazole and coumarin brightening agents. Water-soluble brightening agents can be used such as those described in Albers et al. German Pat. 972,067 and McFall et al. U.S. Pat. 2,933,390 or dispersions of brighteners can be used such as those described in Jansen German Pat. 1,150,274 and Oetiker et al. U.S. Pat. 3,406,070.

Photographic elements containing emulsion layers supersensitized by the invention can be used in photographic elements which contain light absorbing materials and filter dyes such as those described in Sawdey U.S. Pat. 3,253,921; Gaspar U.S. Pat. 2,274,782; Carroll et al. U.S. Pat. 2,527,583 and Van Campen U.S. Pat. 2,956,879. If desired, the dyes can be mordanted, for example, as described in Milton and Jones U.S. Pat. 3,282,699.

The sensitizing dyes (and other emulsion addenda) can be added to the photographic emulsions from water solutions or suitable organic solvent solutions, for example, with the procedure described in Collins et al. U.S. Pat. 2,912,343; Owens et al. U.S. Pat. 3,342,605; Audran U.S. Pat. 2,996,287 or Johnson et al. U.S. Pat. 3,425,835. The dyes can be dissolved separately or together, and the separate or combined solutions can be added to a silver halide emulsion, or a silver halide emulsion layer can be bathed in the solution of dye or dyes.

Photographic emulsions of this invention can be coated by various coating procedures including dip coating, air knife coating, curtain coating, or extrusion coating using hoppers of the type described in Beguin U.S. Pat. 2,681,294. If desired, two or more layers may be coated simultaneously by the procedures described in Russell U.S. Pat. 2,761,791 and Wynn British Pat. 837,095.

Emulsions spectrally sensitized as described herein are useful in colloid transfer processes such as described in Yackel et al. U.S. Pat. 2,716,059; silver salt diffusion transfer processes such as described in Rott U.S. Pat. 2,352,014; Land U.S. Pat. 2,543,181; Yackel U.S. Pat. 3,020,155 and Land U.S. Pat. 2,861,885; color image transfer processes such as described in Rogers U.S. Pats. 3,087,817; 3,185,567; and 2,983,606; Weyerts U.S. Pat. 3,253,915; Whitmore et al. U.S. Pats. 3,227,550, 3,227,551 and 3,227,552; and Land U.S. Pats. 3,415,644; 3,415,645; 3,415,646– and imbibition transfer processes as described in Minsk U.S. Pat. 2,882,156.

Silver halide emulsions containing the supersensitizer combinations of this invention can be used in elements designed for color photography, for example, elements containing color-forming couplers such as those described in Frolich et al. U.S. Pat. 2,376,679; Vittum et al. U.S. Pat. 2,322,027; Fierke et al. U.S. Pat. 2,801,171; Godowsky U.S. Pat. 2,698,794; Barr et al. U.S. Pat. 3,227,554 and Graham U.S. Pat. 3,046,129; or elements to be developed in solutions containing color-forming couplers such as those described in Mannes and Godowsky U.S. Pat. 2,252,718; Carroll et al. U.S. Pat. 2,592,243 and Schwan U.S. Pat. 2,950,970.

Exposed photographic emulsions of this invention can be processed by various methods including processing in alkaline solutions containing conventional developing agents such as hydroquinones, catechols, aminophenols, 3-pyrazolidones, phenylenediamines, ascorbic acid derivatives, hydroxylamines, hydrazines, and the like; web processing such as described in Tregillus et al. U.S. Pat. 3,179,517; stabilization processing as described in Yackel et al. "Stabilization Processing of Films and Papers," PSA Journal, vol. 16B, August 1950; monobath processing as described in Levy "Combined Development and Fixation of Photographic Images With Monobaths," Phot. Sci. and Eng., vol. 2, No. 3, October 1958, and Barnes et al. U.S. Pat. 3,392,019. If desired, the photographic emulsions of this invention can be processed in hardening developers such as those described in Allen et al. U.S. Pat. 3,232,761; in roller transport processors such as those described in Russell U.S. Pat. 3,025,779; or by surface application processing as described in Example 3 of Kitze U.S. Pat. 3,418,132.

The silver halide emulsions supersensitized by the dye combinations of this invention can be used for making lithographic printing plates such as by the colloid transfer of undeveloped and unhardened areas of an exposed and developed emulsion to a suitable support as described in Clark et al. U.S. Pat. 2,763,553; to provide a relief image as described in Woodward U.S. Pat. 3,402,045 or Spencer U.S. Pat. 3,053,658; to prepare a relief printing plate as described in Baxter et al. U.S. Pat. 3,271,150.

The following example is included for further understanding of this invention. In the example the dyes and the sulfonated stilbene compound are identified by the numbers and letters used in the listings above.

EXAMPLE

Dyes I through XIII are added to separate portions of a silver bromoiodide gelatin emulsion of the type described by Trivelli and Smith, Phot. Journal, 79, 330 (1939). To portions of the emulsions containing the indicated dye are added the triazinylamino stilbene disulfonic acid salt, Compound X. To other portions is added for comparison a dye A which can be identified as follows:

5-[di(1-ethyl - 2(1H) - β - naphthothiazolylidene)isopropylidene]1,3-di(β-methoxyethyl)barbituric acid

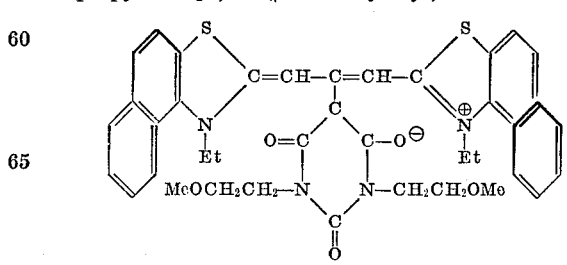

In these preparations the dyes dissolved in suitable solvents are added to separate portions of the emulsions at concentrations indicated in the table hereinafter. After being digested at 40° C. for 10 minutes, the emulsions are coated on a cellulose acetate film support at a coverage of 432 mg. of Ag/ft.$^2$. A sample of each coating is exposed on an Eastman Type 1B sensitometer through Wratten 61+16 filters (green) to a tungsten light source, processed 3 minutes in Kodak D-19 developer at 20° C., fixed, washed and dried. The results are as follows:

| Coating number | Dye | Conc., g./Ag mole | Super-sensitizer | Conc., g/Ag mole | (Wratten 16+61) relative speed |
|---|---|---|---|---|---|
| 1 | I | .08 | | | 100 |
| 2 | I | .08 | Dye A | .02 | 417 |
| 3 | I | .08 | X | .50 | 933 |
| 4 | II | .08 | | | 100 |
| 5 | II | .08 | Dye A | .02 | 178 |
| 6 | II | .08 | X | .50 | 204 |
| 7 | III | .08 | | | 100 |
| 8 | III | .08 | Dye A | .02 | 138 |
| 9 | III | .08 | X | .50 | 174 |
| 10 | IV | .08 | | | 100 |
| 11 | IV | .08 | Dye A | .02 | 120 |
| 12 | IV | .08 | X | .50 | 159 |
| 13 | V | .08 | | | 100 |
| 14 | V | .08 | Dye A | .02 | 1,510 |
| 15 | V | .08 | X | .50 | 1,910 |
| 16 | VI | .08 | | | 100 |
| 17 | VI | .08 | Dye A | .02 | 331 |
| 18 | VI | .08 | X | .50 | 398 |
| 19 | VII | .08 | | | 100 |
| 20 | VII | .08 | Dye A | .02 | 138 |
| 21 | VII | .08 | X | .50 | 550 |
| 22 | VIII | .08 | | | 100 |
| 23 | VIII | .08 | Dye A | .02 | 105 |
| 24 | VIII | .08 | X | .50 | 159 |
| 25 | IX | .08 | | | 100 |
| 26 | IX | .08 | Dye A | .02 | 120 |
| 27 | IX | .08 | X | .50 | 200 |
| 28 | X | .08 | | | 100 |
| 29 | X | .08 | Dye A | .02 | 105 |
| 30 | X | .08 | X | .50 | 166 |
| 31 | XI | .08 | | | 100 |
| 32 | XI | .08 | Dye A | .02 | 132 |
| 33 | XI | .08 | X | .50 | 159 |
| 34 | XII | .08 | | | 100 |
| 35 | XII | .08 | Dye A | .02 | 83 |
| 36 | XII | .08 | X | .50 | 110 |
| 37 | XIII | .08 | | | 100 |
| 38 | XIII | .08 | Dye A | .02 | <1 |
| 39 | XIII | .08 | X | .50 | 145 |
| 40 | | | Dye A | .02 | |
| 41 | | | X | .50 | |

The results listed in the table above show that the colorless triazinylamino stilbene sulfonates such as Compound X readily supersensitize the cyanine and merocyanine dyes containing imidazolo[4,5-b]quinoline nuclei, such as dyes I through XIII. The resulting supersensitization exceeds and usually far exceeds that of previously known supersensitizers and sensitizing combinations involving imidazolo[4,5-b]quinoline dyes as illustrated by the compositions containing dye A plus one of the dyes I–XIII.

The invention has been described in detail with particular reference to preferred embodiments thereof, but it will be understood that variations and modifications can be effected within the spirit and scope of the invention.

I claim:

1. A light-sensitive photographic silver halide emulsion sensitized with a supersensitizing combination comprising (a) a cyanine or merocyanine imidazolo[4,5-b]quinoline dye and (b) as a supersensitizer therefor, a colorless derivative of a bis(s-triazin-2-ylamino)stilbene sulfonic acid.

2. A light-sensitive photographic silver halide emulsion according to claim 1 wherein said dye is of the formula (1)

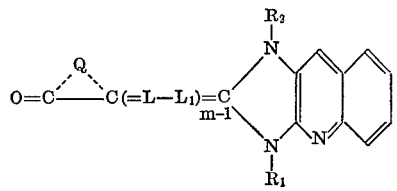

or (2)

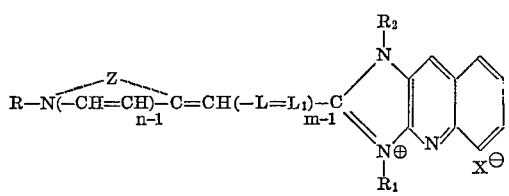

wherein Z represents the nonmetallic atoms required to complete a heterocyclic nucleus of from 5 to 6 atoms in the heterocyclic ring; R represents an alkyl group of from 1 to 18 carbon atoms or an aryl group of from 6 to 12 carbon atoms; $R_1$ represents an alkyl group; $R_2$ represents an alkyl group or an aryl group; L and $L_1$ each represents a methine group; $n$ represents an integer from 1 to 2; $m$ represents an integer from 1 to 3; and X represents an acid anion; and Q represents the non-metallic atoms necessary to complete a heterocyclic nucleus containing from 5 to 6 atoms in the heterocyclic ring, three or four of said atoms being carbon, and two of said atoms being selected from the group consisting of nitrogen, oxygen and sulfur, at least one of said two atoms being nitrogen.

3. A light-sensitive photographic silver halide emulsion according to claim 2 wherein said bis(s-triazin-2-ylamino)-stilbene compound is of the structure

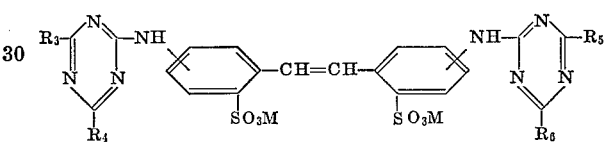

wherein M represents hydrogen or a water-soluble cation and $R_3$, $R_4$, $R_5$ and $R_6$ each represents hydrogen, hydroxyl, aryloxyl, alkoxyl, halogen, a heterocyclic radical, alkylthio, arylthio or amino.

4. A light-sensitive photographic silver halide emulsion according to claim 2 wherein
Z represents the non-metallic atoms required to complete a heterocyclic nucleus selected from the group consisting of a thiazole nucleus, a benzothiazole nucleus, a naphthiothiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3,3-dialkylindolenine nucleus, an imidazole nucleus, a benzimidazole nucleus and a naphthimidazole nucleus, and
Q represents the non-metallic atoms necessary to complete a heterocyclic nucleus containing from 5 to 6 atoms in the heterocyclic ring of said nucleus which is selected from the group consisting of 2-thiazolin-4-one nucleus, a 2-thio-2,4-thiazolidinedione nucleus, a 2-thio-2,5-thiazolidinedione nucleus, a 2-alkylmercapto-2-thiazolin-4-one nucleus, a 4-thiazolidinone nucleus, a 2-alkylphenylamino - 2 - thiazolin-4-one nucleus, a 2-diphenylamino-2-thiazolin-4-one nucleus, a 2-thiazolin-5-one nucleus, a 2-thio-2,4-oxazolidinedione nucleus, a 2 - oxazolin - 5 - one nucleus, a hydantoin nucleus, a 2-thiohydantoin nucleus, a 2-alkylmercapto-2-imidazolin-5-one nucleus, a thionaphthenone nucleus, a 2-pyrazolin-5-one nucleus, an oxindole nucleus, a barbituric acid nucleus and a 2-thiobarbituric acid nucleus.

5. A light-sensitive photographic silver halide emulsion according to claim 2 in which the dye is selected from the group consisting of 1,1'-3,3'-tetraethyl-1H-imidazolo-[4,5-b]quinocarbocyanine iodide,
3,3'-diethyl-1,1'-diphenyl-1H-imidazolo-[4,5-b]quinocarbocyanine iodide, 3,3'-dimethyl-1,1'-diphenyl-1H-imidazolo-
  [4,5-b]quinocarbocyanine iodide,
3,3'-diethyl-1-phenyl-1H-imidazolo-quino-
  thiacarbocyanine iodide,
1,3-diethyl-1',3',3'-trimethyl-1H-imidazolo-
  [4,5-b]quinoindocarbocyanine iodide,
1,3,3'-triethyl-1H-imidazolo[4,5-b]-quino-
  oxacarbocyanine iodide,
1',1,3-triethyl-1H-imidazolo[4,5-b]quino-2'-
  carbocyanine iodide,
3-ethyl-5-[(1,3-diethyl-1H-imidazolo[4,5-b]quinolin-
  2-ylidene)-ethylidene]-2-thio-2,4-oxazolidinedione,
3-ethyl-5-[(1,3-diethyl-1H-imidazolo[4,5-b]quinolin-
  2-ylidene)ethylidene]rhodanine,
3-ethyl-5-[(3-ethyl-1-phenyl-1H-imidazolo[4,5-
  b]quinolylidene)]ethylidene rhodanine,
3-ethyl-5-[(3-ethyl-1-phenyl-1H-imidazolo[4,5-
  b]quinolin-2-ylidene)ethylidene]-2-thio-2,4-
  oxazolidonediome,
1-ethyl-5-[(3-ethyl-1-phenyl-1H-imidazolo[4,5-
  b]quinolin-2-ylidene)ethylidene]-2-thiobarbituric
  acid and,
3-ethyl-5-[(3-ethyl-1-phenyl-1H-imidazolo[4,5-
  b]quinolin-2-ylidene)ethylidene]-1-phenyl-2-
  thiohydantoin.

6. A light-sensitive photographic silver halide emulsion according to claim 5 in which said supersensitizer is a salt of 4,4'-bis[anilino-6-hydroxy-s-triazin-2-ylamino]stilbene-2,2'-disulfonic acid.

References Cited
UNITED STATES PATENTS

| | | | |
|---|---|---|---|
| 2,945,762 | 7/1960 | Carroll et al. | 96—126 |
| 2,933,390 | 4/1960 | McFall et al. | 96—126 |

J. TRAVIS BROWN, Primary Examiner

J. L. GOODROW, Assistant Examiner

U.S. Cl. X.R.

96—101